INVENTOR.
HAROLD FISHER
BY
ATTORNEY

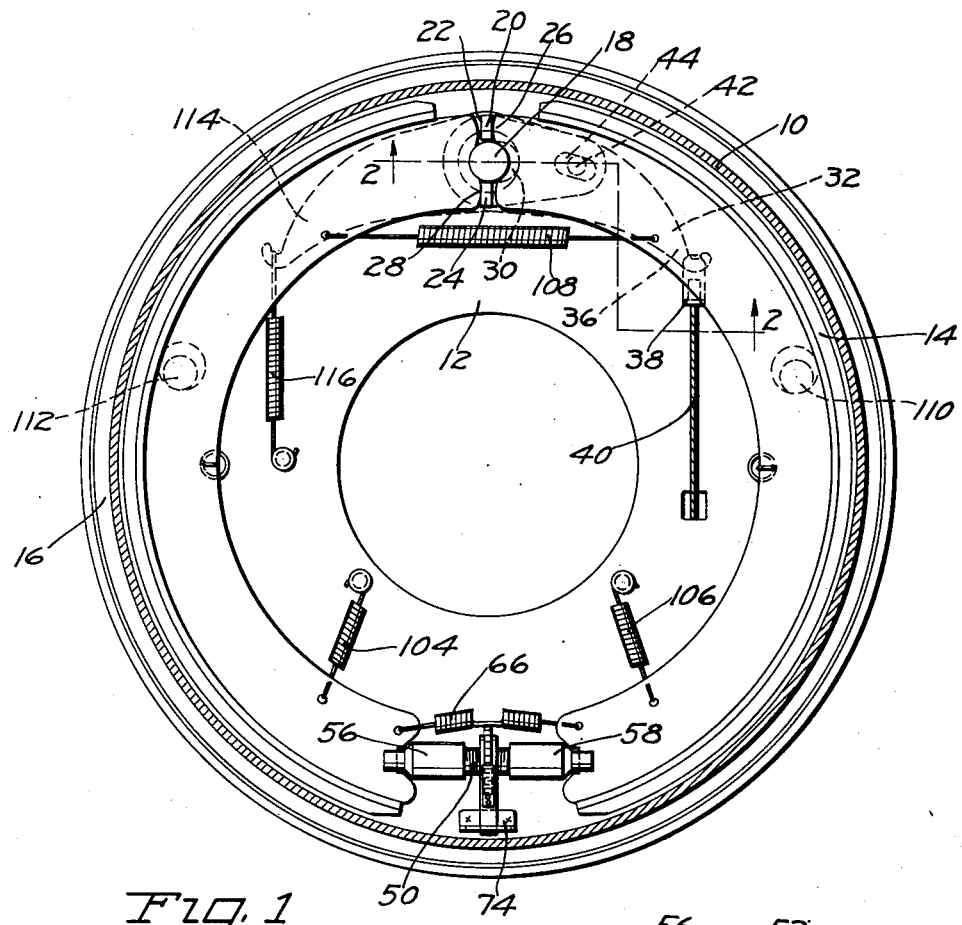
Fig. 1
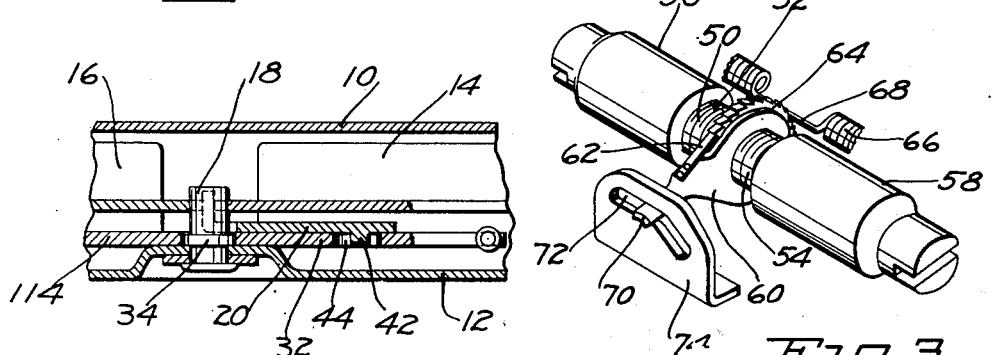
Fig. 2
Fig. 3
INVENTOR.
HAROLD FISHER
BY F. P. Keiper
ATTORNEY Sept. 19, 1939.     H. FISHER     2,173,582
BRAKE
Filed July 28, 1932     2 Sheets-Sheet 2

Patented Sept. 19, 1939

2,173,582

UNITED STATES PATENT OFFICE 2,173,582

BRAKE

Harold Fisher, South Bend, Ind., assignor to Bendix Aviation Corporation, South Bend, Ind., a corporation of Delaware Application July 28, 1932, Serial No. 625,487

4 Claims. (Cl. 188—78)

This invention relates to brakes and is illustrated as embodied in a brake of the internal expanding type wherein floating friction shoes are used.

In the above type of brake employing friction means such as a pair of shoes linked together and adapted to float to an anchor means located adjacent one pair of shoe ends, considerable difficulty is had in providing an actuating cam which is readily adapted to float with the shoes and actuate the shoes an equal amount regardless of the direction of rotation of the brake. Such difficulty arises from the fact that upon one direction of rotation the cam anchors or fulcrums about a point upon one shoe which is further from the center of the brake than the point of which the same cam anchors on the other shoe when the brake is rotating in reversed direction. Such action results in unequal cable or linkage movement for the same braking effect when rotating in one direction or in reverse direction.

In four wheel brake installations wherein a pair of cams or the like operating means for brakes at the front of the vehicle rotate in effect in a reverse direction from those for the brakes at the rear of the vehicle, the parts in the front wheel brakes being reversed with respect to the corresponding parts in the rear wheel brakes, considerable difficulty results since the actuating cables or links of the various brakes which are hooked up for simultaneous action do not have the same travel for an equal brake application. Should the parts of the rear wheel brakes be arranged the same as the parts of the front wheel brakes rather than reversed, the control pedal movement would have to be greater for one direction of braking than for the other thus requiring a large reserve pedal movement for safety purposes.

This invention is adapted to overcome these difficulties by utilizing the floating movement of the shoes in a manner so as to control the actuating cable or linkage movement, and further permits if desired the use of improved automatic adjustment mechanism also dependent upon shoe floating for operation, together with other novel structural details.

It is accordingly an object of this invention to provide an actuating mechanism, which may to a considerable extent, improve the hereinabove referred to undesirable conditions.

A further object is the provision of actuating mechanism utilizing the floating movement of the brake shoes for the purpose of regulating the movement of the actuating linkage or cable.

A further object is the provision of a brake having a floating cam and a pivoted lever and a connection therebetween adapted to equalize the lever travel by employing floating movement of the cam.

A further object of the invention is the provision of actuating levers and novel connecting means in a single anchor duo servo type of brake whereby the ultimate cable or actuating linkage movement will be the same in either direction of drum rotation.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Figure 1 is a front elevation partly in section of a brake employing the equal action cam together with improved cable link and automatic adjustment device;

Figure 2 is a section along the line 2—2 illustrating the floating cam and pivoted lever;

Figure 3 is a perspective view of the automatic adjustment device;

Figure 4:
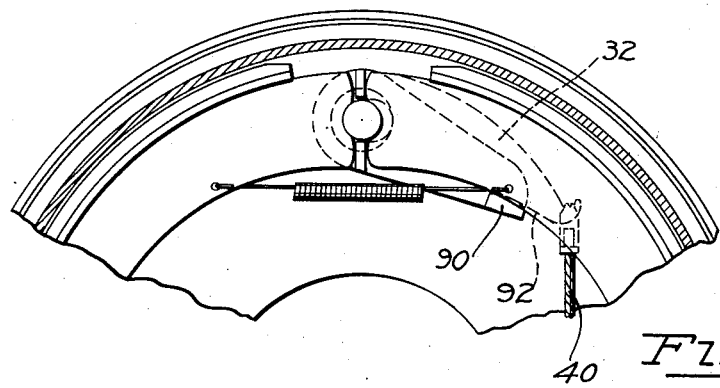
Figure 4 is a modified form of pivoted lever and floating cam.

Referring more particularly to Figure 1, there is shown the usual brake drum 10, backing plate 12, friction shoes 14 and 16, and an anchor 18. For the purpose of actuating the shoes 16 and 14 into drum engagement a floating cam 20 may be provided having bent over lug portions 22 and 24 which form cam surfaces for engaging the shoe ends 26 and 28 respectively. To permit floating movement, so that the actuating lever will permit either of the shoes 14 or 16 to anchor dependent on the drum rotation direction, an elongated slot 30 is provided in the cam 20. For the purpose of actuating the cam 20, a lever 32 is provided which is pivoted preferably upon a shouldered portion 34 of the anchor pin 18, and is provided at its end 36 with a hook which is adapted to engage a link 38 and tension cable 40.

In order to actuate the floating cam 20 by means of the lever 32, a pin or lug 42 may be provided on either the cam or the lever, but preferably upon the cam, as shown and a corresponding slot 44 preferably located in the lever 32. The slot 44 may be sloped in the manner shown in Figure 1, the degree of which may be readily determined by rotation of the lever 32 to the most extreme position which may be encountered in brake application and rocking the cam 20 to the corresponding extreme position for the same brake application in both forward and reverse braking. The pin 42 will thus indicate the proper extreme end positions of the slot which will be found to slope similarly to that shown in Figure 1. Thus the floating action of the shoe is utilized for the purpose of equalizing the lever movement for each direction of rotation.

A novel automatic adjusting link, more fully described and claimed in my copending divisional application Serial No. 96,835, filed August 19, 1936, may be employed between the shoe ends diametrically opposite the anchor, as may be seen in Figure 1. A perspective view of the adjustment shown in Figure 3 shows the same as comprising a screw member 50 having right and left-hand threaded ends 52 and 54 threaded into internally threaded sockets 56 and 58 which in turn are slotted at their ends to engage the webs of the adjacent shoe ends.

Pivoted on the central body portion of the screw 50 is a short lever 60 which carries a pawl 62 adapted to engage a ratchet wheel 64 which is fixed to and rotates with the screw 50. A spring 66, which may preferably be connected to the ends of the shoes is provided with a straight portion 68 engaging the teeth of the ratchet wheel 64 and prevents unwarranted movement thereof. The end 70 of the lever 60 is adapted to extend into a cam slot 72 provided in a member 74 which is secured to the backing plate 12. The cam may be so sloped, as shown in Figure 3, as to transform the circumferential floating movement of the lever into oscillating motion which is adapted to actuate the ratchet 64 and adjust the brake.

The slot, as shown in Figure 3, is adapted to actuate the adjustment upon one direction of rotation only, although it may be so arranged as to actuate the automatic adjustment in either direction of rotation by extending the sloped slot or changing the shape to that of a V.

Figure 6:
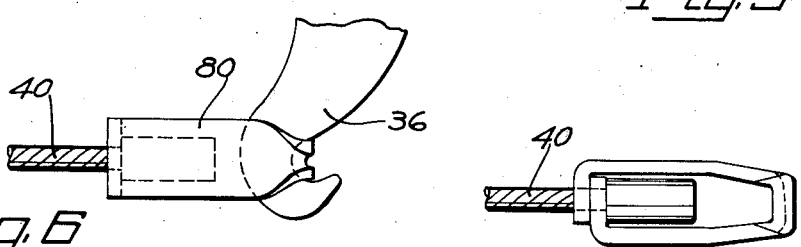
Figure 6 is an enlarged side elevation illustrating a link for connecting an operating cable and hook.
Figure 7:
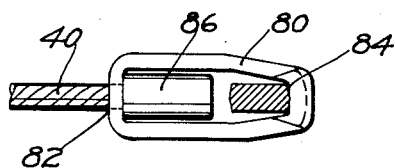
Figure 7 is a top view of the structure of Figure 6.

A connecting link 80, as shown in Figures 6 and 7, for the cable and operating lever may be made of a section of seamless tubing elongated and perforated at one end as at 82 for the reception of a cable and crimped or rounded at the other end to afford a smooth bearing surface, as at 84 for engagement with the hook 36. The collar 86 is preferably secured to the cable end to prevent the same from sliding through the aperture.

Figure 8:
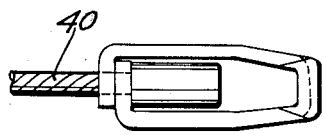
Figure 8 is a modified form of the link shown in Figure 6.

In Figure 8, a similar structure appears wherein a link is made of a strip bent to shape and having apertured ends overlapped and welded or otherwise suitably secured together as by the cable passing through the apertures.

In Figure 4, there is shown a modified form of actuating means wherein the cam is provided with a bent over lug 90 which is adapted to engage the sloped surface 92 of the operating lever 32.

Figure 5:
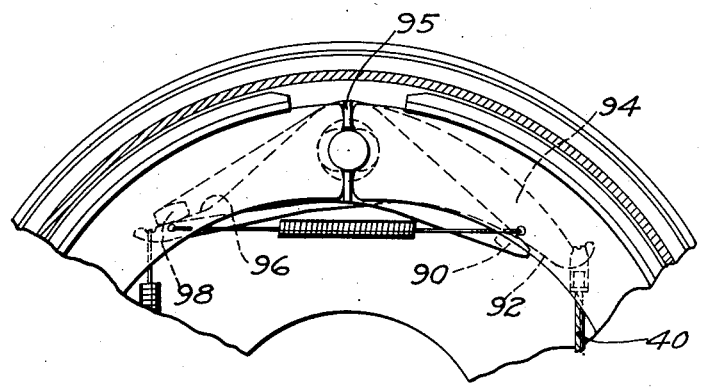
Figure 5 is another modified form of pivoted lever and floating cam.

In the modification shown in Figure 5, the operating lever 94 is also provided with a sloped edge 92 adapted to engage a lug 90 on the actuating cam and is further provided on the opposite side of a second sloped surface 96 adapted to engage a second lug 98 thus relieving the cam 95 from frictionally engaging the anchor during its floating movement. In each of these modifications the sloped surface is preferably generated in a manner similar to the slot of Figure 1.

As shown in Figure 1, various springs 104, 106, and 108 may be provided together with eccentric release positions cams 110 and 112 for the purpose of urging the shoes into disengaged position. An extended hook member 114 may be provided either upon the operating lever 32 or the cam 20 together with a spring 116 for the purpose of urging the actuating mechanism to released position.

In operation, it will be readily seen that a pull upon the cable 40 will rock the actuating cam 20 spreading the shoes 14 and 16 into drum engagement and causing one end or the other to anchor. As the cam 20 floats with the shoe during this movement, the lug or pin 42 will ride one way or the other in the slot 44 and thus compensate for the unequal forward and reverse movement of the cable 40. Should the brake become worn and the lever 70 of the automatic adjustment mechanism moved to an extreme position in the slot 72, the pawl 62 will be rotated sufficiently to engage a new tooth on the ratchet 64 and upon return or release movement of the brake, the pawl 62 will rotate the ratchet 64 an angular movement equal to the pitch of a single tooth and cause the ratchet to move one tooth with respect to the straight portion 68 of the spring 66. Since the slot, as shown in Figure 3, is sloped only over one-half its length, automatic adjustment may take place in one direction of rotation only for in floating in the opposite direction the lever 70 will not be rocked.

It will, of course, be understood that the pitch of the threads 54 and 52 and the teeth of the ratchet 64 together with the slope of the slot 72 all may be varied to give any degree of adjustment desired relative to the degree of floating movement, and that various other automatic adjustment devices well known in the art may be provided in place of the eccentric release position members 110 and 112.

While various embodiments and modifications of the invention have been illustrated and described it is to be understood that the invention is not limited thereto but may be embodied in various mechanical forms. As such changes in construction and arrangement of parts may be made without departing from the spirit of the invention as will be well apparent to those skilled in the art, reference will be had to the appended claims for a definition of the limits of the invention.

What is claimed is:

1. A brake comprising a drum, a backing plate at the open side of the drum, an anchor carried by the backing plate, a floating friction means within the drum and including shoes having a pair of adjacent ends, either one of which may engage said anchor depending upon drum rotation direction, a spreading cam adapted to float on said anchor and having an operating arm extending along a chord of the drum between the backing plate and one end of the friction means, and arranged to fulcrum on one shoe and above the anchor for one direction of drum rotation, and below the anchor on the other shoe end for reverse rotation, an operating lever pivoted to said anchor and arranged beside said arm in the space between the backing plate and friction means, and means connecting said lever and arm, said means adapted to compensate for the shifting of said cam due to the change of fulcrum upon forward and reverse braking.

2. A brake comprising an anchor, a floating actuating cam thereon, a pivoted lever thereon, equal action connecting means between said lever and said cam, a flexible cable having a collar thereon, and a looped connecting link threaded on said cable below said collar and encompassing a hooked end of said pivoted lever.

3. In a brake comprising an anchor and floating friction shoes, an operating lever pivoted on said anchor, an actuating cam floatingly engaging said shoes adjacent said anchor, said lever and said cam having arms extending on opposite sides of said anchor, the arms of one being provided with cam surfaces and the arms of the other being provided with lugs engaging said surfaces.

4. Brake actuating mechanism comprising an operating lever mounted on a fixed pivot and having arms extending on opposite sides of said pivot, a floating actuating member overlying said lever and having corresponding arms, adjacent pairs of said arms being provided with cooperating cam surfaces and lugs.

HAROLD FISHER.